UNITED STATES PATENT OFFICE.

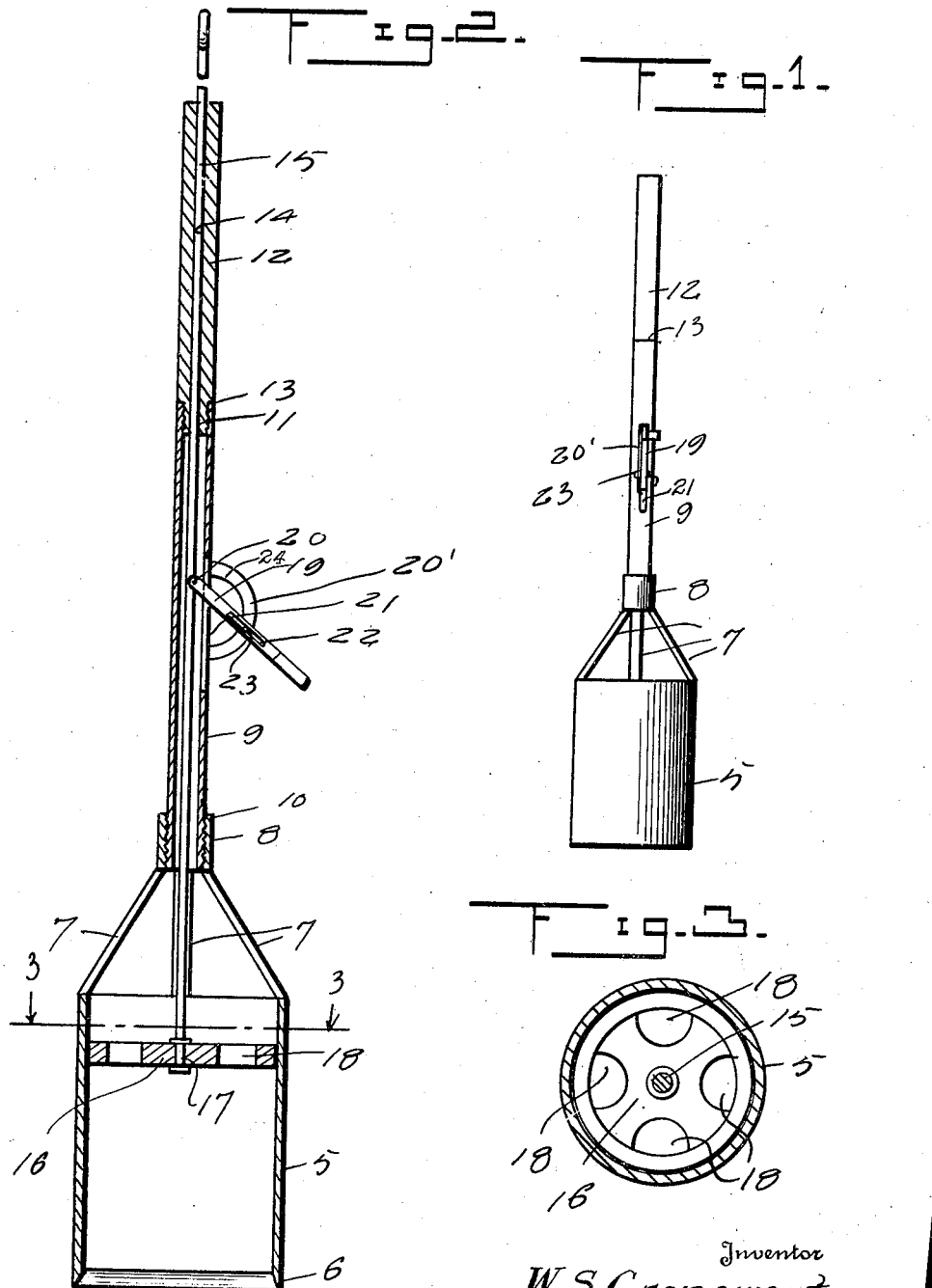

WINFIELD SCOTT CRONOWERT, OF ADDIE, IDAHO.

POSTHOLE-DIGGER.

1,335,878.  Specification of Letters Patent.  Patented Apr. 6, 1920.

Application filed April 20, 1918. Serial No. 229,827.

*To all whom it may concern:*

Be it known that I, WINFIELD SCOTT CRONOWERT, a citizen of the United States, residing at Addie, in the county of Bonner and State of Idaho, have invented certain new and useful Improvements in Posthole-Diggers; and I do hereby declare the following to be a full, clear, and exact description of the invention, such as will enable others skilled in the art to which it appertains to make and use the same.

My invention relates to improvements in post hole diggers.

An important object of the invention is to provide an implement of the above mentioned character, which is simple in construction, cheap to manufacture, and may be used in a highly expeditious manner, thereby effecting a substantial saving in labor and time.

Other objects and advantages of the invention will be apparent during the course of the following description.

In the accompanying drawings forming a part of this specification and in which like numerals are employed to designate like parts throughout the same, Figure 1 is a side elevation of a post hole digger embodying my invention, Fig. 2 is a central longitudinal sectional view through the same, and, Fig. 3 is a transverse section taken on line 3—3 of Fig. 2.

In the drawings, wherein for the purpose of illustration is shown a preferred embodiment of my invention, the numeral 5 designates a cutter or blade which is cylindrical or tubular, and has its lower end sharpened, as shown at 6.

Secured to the upper end of the cylindrical cutter or blade 5 are spaced upwardly converging arms 7, which have a ring 8 rigidly secured to their upper ends.

The numeral 9 designates a pipe-section, constituting a portion of the handle. The lower end of the pipe-section 9 projects into the ring 8, and is screw-threaded therein, as shown at 10. At its upper end, the pipe section 9 is internally screw-threaded, to engage with a reduced screw-threaded extension 11 of a weight handle-extension 12, as shown at 13. The handle extension 12 may be formed of iron or the like, to impart to the implement a proper weight or inertia, in use.

The weight handle-section 12 has a longitudinal bore 14, receiving a reciprocatory plunger rod 15, extending through the pipe section 9. The plunger rod 15 extends upwardly beyond the handle-section 12 and may be moved downwardly by contact with a suitable object.

At its lower end, the plunger-rod 15 has connection with a plunger or ejector 16, as shown at 17. This plunger operates within the cylindrical cutter 5, to force the dirt out of the same. This plunger has air discharge openings 18, as shown.

Instead of moving the plunger-rod 15 downwardly by contact with the upper end thereof, it may be shifted by means of a hand lever 19, pivoted thereto, as shown at 20. This hand lever operates through a slot 21 and is provided with a slot 22, receiving a pin 23, attached to a bracket or quadrant 24. The bracket 24 is secured to the pipe section 9.

In the use of the implement, the plunger 16 is shifted to the upper position, and the cutter 5 forced into the ground, whereby the cutter becomes filled with earth.. When the cutter is elevated the earth remains therein, thus forming the hole. The plunger rod 15 is now moved downwardly, to move the plunger 16 in a direction to eject the earth from the cutter 5.

It is to be understood that the form of my invention herewith shown and described is to be taken as a preferred example of the same, and that various changes may be resorted to, in the shape, size, and arrangement of parts, without departing from the spirit of my invention or the scope of the subjoined claim.

Having thus described my invention what I claim is:

A post-hole digger including a hollow cutter, a tubular section connected to the cutter, an elongated handle carried by the tubular section and having a longitudinally extending bore, a plunger arranged within said cutter, a plunger rod connected to said plunger and extending through said tubular member and the bore of said elongated handle, a bracket carried by said tubular member, a pivot pin carried by the outer portion of the bracket, and a lever pivoted at its forward end to said plunger rod and having an elongated slot in its central portion receiving said pivot pin, said lever being adapted for reciprocating the plunger rod vertically in spaced relation to said tubular member.

In testimony whereof I affix my signature in presence of two witnesses.

WINFIELD SCOTT CRONOWERT.

Witnesses:
J. F. ARMSTRONG,
M. A. ERAUT.